Feb. 21, 1961 G. E. WILLIAMS 2,972,368
VEHICLE TIRE
Filed May 26, 1958
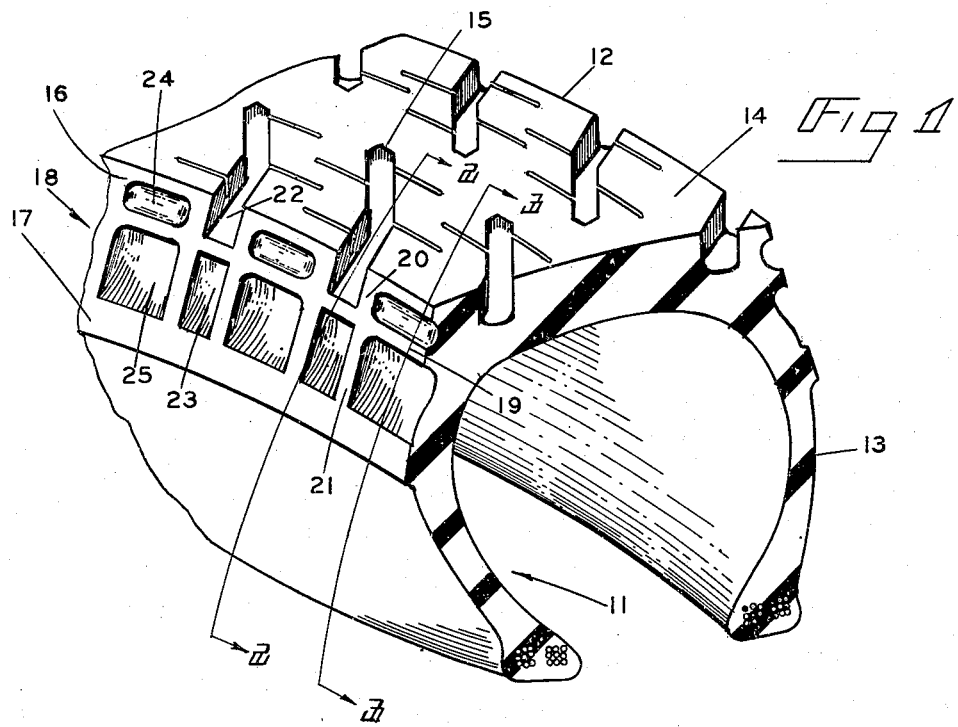
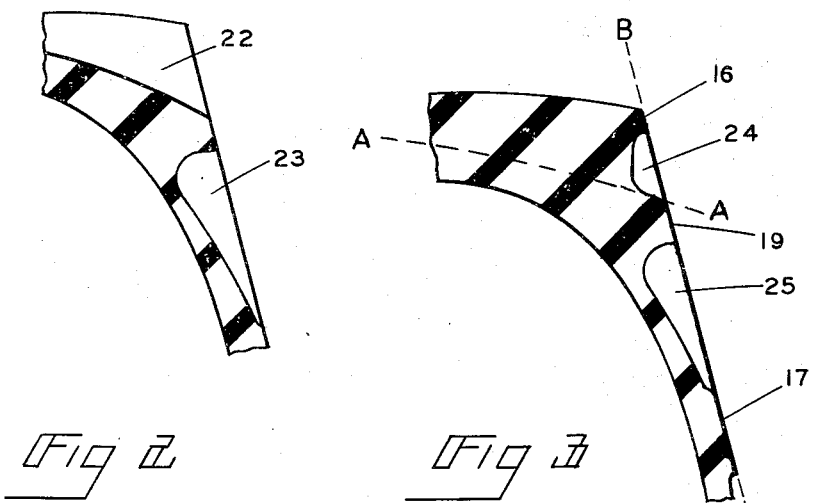
INVENTOR.
GORDON E. WILLIAMS
BY
Reuben Wolk
ATTORNEY

United States Patent Office

2,972,368
Patented Feb. 21, 1961

2,972,368

VEHICLE TIRE

Gordon E. Williams, Dayton, Ohio, assignor to Dayco Corporation, a corporation of Ohio Filed May 26, 1958, Ser. No. 737,881

4 Claims. (Cl. 152—209)

This invention relates to vehicle tires of the type used on conventional trucks and passenger automobiles. More specifically, this invention relates to an improvement in the buttress portion of the tire.

Certain types of vehicle tires are formed with treads comprising alternate ground contacting portions, known as tread ribs, alternating with voids between these ribs. In such treads, the ends of the tread voids naturally provide recesses in the shoulder which is located in the intersection of the tread surface and the sidewall. While such tire tread designs are desirable from many standpoints, the existence of these recesses can provide several problems which must be overcome.

In the first place, the absence of tread material in these voids provides a certain amount of instability in the tread which must be overcome by some type of reinforcement in the buttress portion. A second disadvantage is involved when the tire is ready to be recapped. Since recapping of tires is extremely important, particularly for truck fleet owners, it is necessary that a good capping joint be provided with a maximum of adhesion area. With the void recesses as described above, the capping process would normally tend to permit rubber to overflow into the recesses formed in the buttress portion which would affect the adhesion properties as well as the appearance of such a recap. Both of these disadvantages may be overcome by the provision of a circumferential rib located in the buttress portion of the tire between the shoulder and the buffing bar. This circumferential rib will thus provide a structural reinforcement to overcome the instability created by the tread voids, and at the same time will provide a sort of dam preventing the tread rubber from flowing into the buttress recesses. In addition, this rib provides a guideline to assist the recapper in removing the old tread.

It is, therefore, a primary object of this invention to overcome instability in tire treads.

It is a further object of this invention to provide a means for improved recapping processes.

It is still another object to provide a guiding means for assisting in the recapping process.

The above and other objects will be readily apparent from the following specification and drawings, in which:

Figure 1 is a fragmentary perspective view of a tire illustrating the novel features of the invention.

Figure 2 is a fragmentary section of the tire taken along lines 2—2 of Figure 1.

Figure 3 is a fragmentary view of a tire taken along lines 3—3 of Figure 1.

Referring now to the drawings, Figure 1 illustrates a portion of a tire 11 consisting of a tread section 12 and a sidewall section 13. The tread section consists of tread ribs or ground contacting portions 14 in the plane of the tread, and tread voids 15 defined by the tread ribs. The sidewall portion of the tire includes a shoulder 16 which is formed by the inner section of the sidewall and outer surface of the tread. Thus, the shoulder may be said to consist of an arris formed by the intersection of the planes of the tread and sidewall and extending circumferentially of the tire. In the present application, the shoulder will actually be considered as not only this arris, but a thicker portion extending slightly for a short distance down the sidewall. Located below the shoulder 16 is a buffing bar 17 extending circumferentially around the tire. The area of the sidewall between the shoulder and buffing bar is defined as a buttress portion and is designated by reference numeral 18. A principal feature of the present invention is the means by which stabilizing and retreading properties of the tire are improved as stated above. This means consists of a circumferential rib 19 which extends completely around the circumference of the tire and is located approximately one-third of the way from the shoulder to the buffing bar in the buttress portion. The upper surface of the rib will thus define the base of the tread voids 15. This rib will be anywhere from ⅛ in. to ½ in. thick and will preferably be ¼ in. The upper surface of this rib, together with the base of the tread voids 15 and the base of the recesses 22, thus lie in the plane of the base of the tire tread; this plane is, of course, the plane of maximum wear. Extending between the shoulder and the buffing bar at right angles thereto, are radial ribs which intersect the circumferential rib at right angles. This forms a series of radial ribs 20 between the circumferential rib and the shoulder and a series of ribs 21 between the buffing bar and the circumferential rib. Each of the radial ribs 20, in conjunction with the circumferential rib, defines the recesses 22 formed by the intersection of the tread voids with the plane of the sidewall at the shoulder. In radial alignment with these recesses 22 are additional recesses 23 extending radially between the circumferential rib and the buffing bar and defined in a circumferential direction by the radial ribs 21. Alternating with the recesses 22 are a series of additional recesses 24 in the buttress portion which are defined by the radial ribs 20, the shoulder 16, and the circumferential rib 19. In radial alignment with these recesses 24 are a series of additional recesses 25 which are defined by the radial ribs 21, circumferential rib 19, and the buffing bar 17. The result of this construction is a series of recesses formed by the tread voids alternating circumferentially with a series of recesses formed entirely within the buttress portion, and parallel thereto are additional recesses in circumferential alignment. The circumferential rib 19 will thus form a stabilizer or structure reinforcement for the tread voids. The circumferential and radial ribs, shoulder and buffing bar are preferably in the same plane, designated as B—B in Figure 3.

When it is desired to retread a tire of this type, the operator will merely grind or buff the whole tread stock parallel to the original tire circumference using the upper edge of the ribs 19 as a guide. This will result in a smooth surface along the plane of the base of the tread, or plane of maximum tread wear, as designated by dotted line A—A of Figure 3. When the new tread material is added, therefore, there will be no tendency for it to flow into the buttress recesses 23 and 25 because of the presence of this rib 19 which provides a dam to the flow of the rubber. This is true regardless of whether the recapper is attempting to provide a similar or different type of tread design.

The above details illustrate a desirable form of the invention but are not necessarily limited. Other changes may be made without departing from the spirit of the invention.

I claim:

1. In a vehicle tire having a sidewall including a shoulder and a buffing bar defining a buttress portion therebetween, a tread including tread ribs and tread voids defined by said ribs, said voids extending to the plane of the buttress portion to provide recesses in said shoulder, the improvement comprising spaced radial ribs extending between said shoulder and buffing bar, and a circumferential rib approximately one-third the distance from the shoulder to the buffing bar intersecting said radial ribs, said shoulder, radial ribs and circumferential rib defining radial recesses alternating in a circumferential direction with said first-named recesses, said circumferential rib, radial ribs and buffing bar defining additional recesses in radial alignment with said first and second-named recesses.

2. In a vehicle tire having a sidewall including a shoulder and a buffing bar defining a buttress portion therebetween, spaced radial ribs extending between said shoulder and buffing bar, a circumferential rib intersecting said radial ribs, and a tread including tread ribs and tread voids defined by said tread ribs, said voids extending to said circumferential rib to provide recesses in said shoulder, said shoulder, radial ribs and circumferential rib defining radial recesses alternating in a circumferential direction with said first-named recesses.

3. The tire of claim 2 in which said circumferential rib is approximately one-third the distance from the shoulder to the buffing bar.

4. In a vehicle tire having a tread portion and a sidewall including a shoulder and a buffing bar defining a buttress portion therebetween, a circumferential rib in said buttress portion and spaced radial ribs extending between said circumferential rib and shoulder; said radial ribs and circumferential rib defining recesses in said buttress portion which extend inwardly in a generally radial direction into said tread portion to define tread ribs therebetween, the upper surface of said circumferential rib and the base of said recesses lying in the plane of the base of said tread portion.

References Cited in the file of this patent
UNITED STATES PATENTS

| | | |
|---|---|---|
| 943,025 | Kempshall | Dec. 14, 1900 |
| 1,524,177 | Granville | Jan. 27, 1925 |
| 2,303,164 | Hawkinson | Nov. 24, 1942 |
| 2,760,541 | Reifenberger | Aug. 28, 1956 |
| 2,774,409 | Skidmore | Dec. 18, 1956 |